Dec. 29, 1953     E. R. FITCH     2,664,299
TRAILER LANDING GEAR
Filed Aug. 17, 1948     2 Sheets-Sheet 1
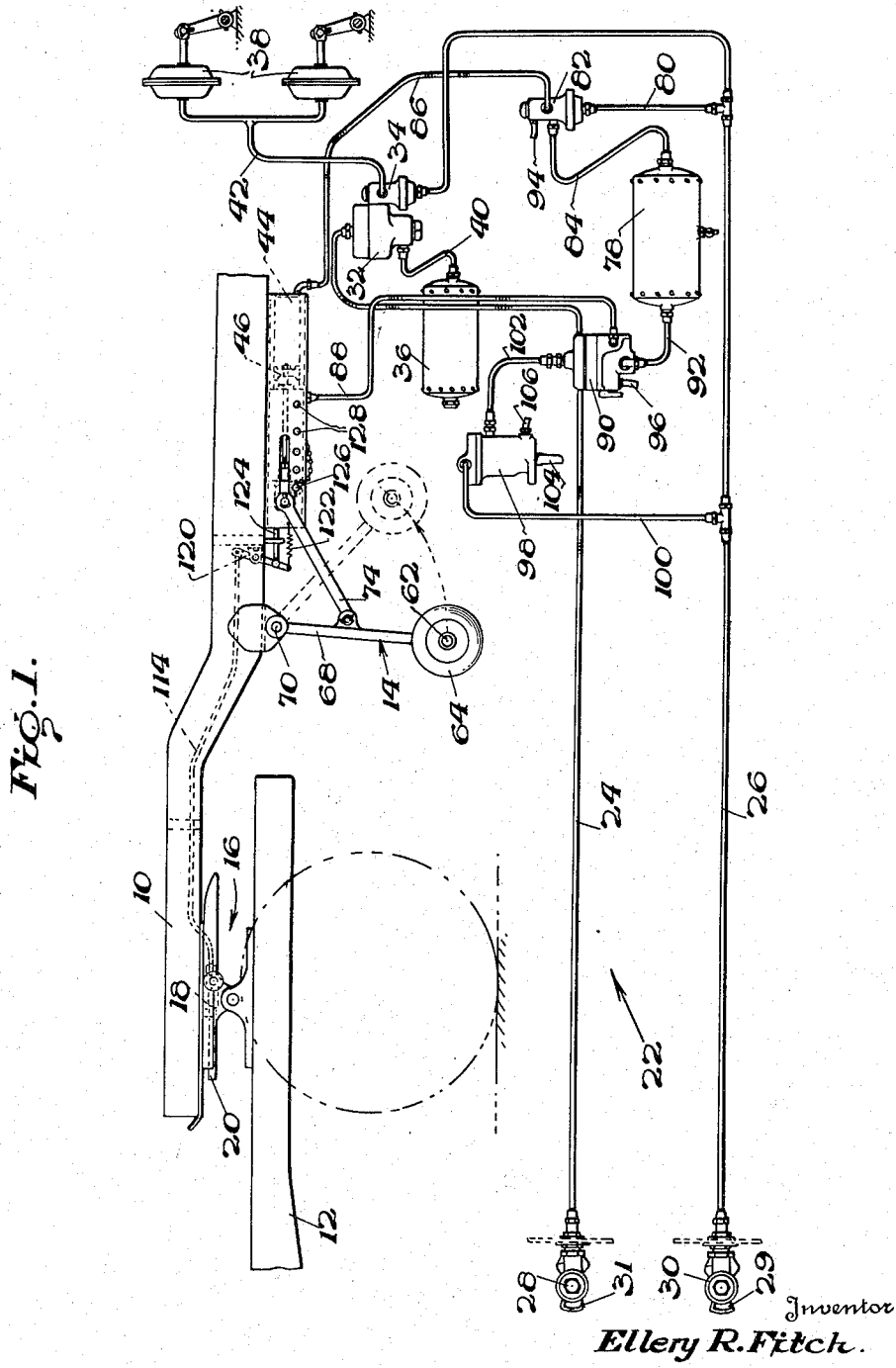
Inventor
*Ellery R. Fitch*.
By *Scrivener + Parker*
Attorneys

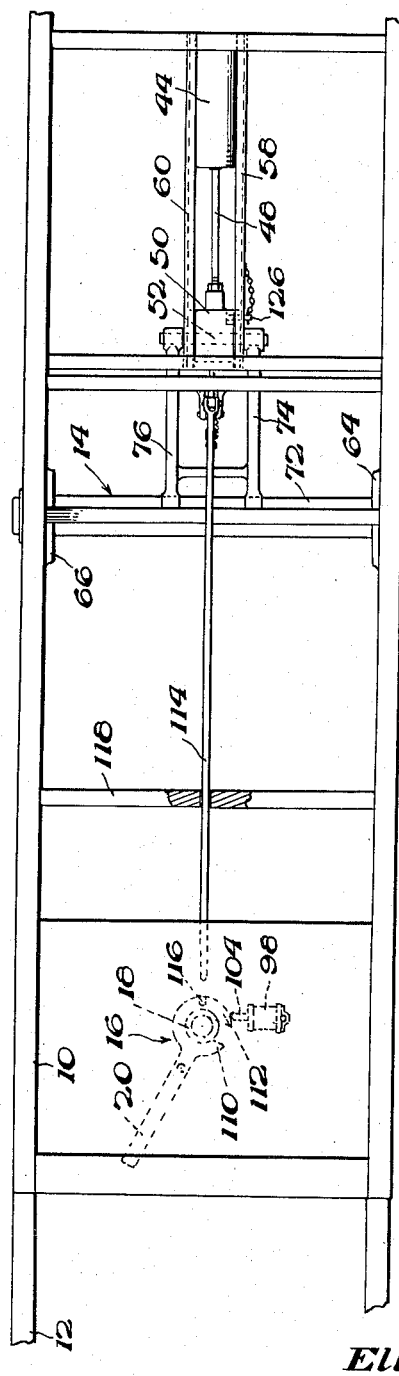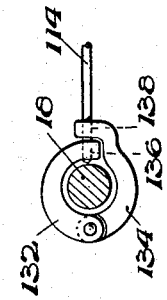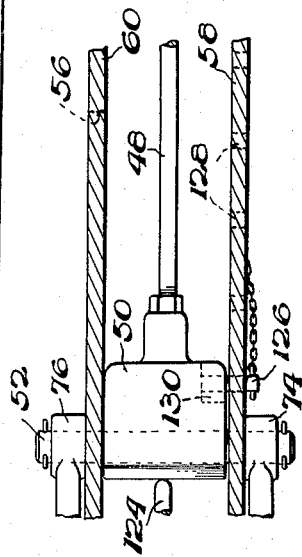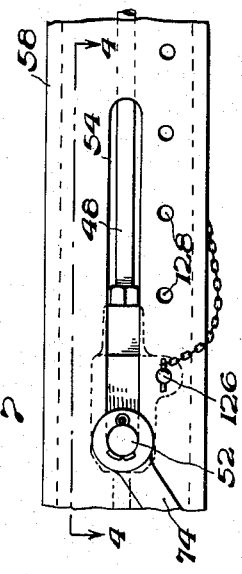

Patented Dec. 29, 1953

2,664,299

UNITED STATES PATENT OFFICE 2,664,299

TRAILER LANDING GEAR

Ellery R. Fitch, Elyria, Ohio, assignor to Bendix-Westinghouse Automotive Air Brake Company, Elyria, Ohio, a corporation of Delaware Application August 17, 1948, Serial No. 44,741

11 Claims. (Cl. 280—429)

This invention relates to a landing gear construction for trailer vehicles, and more particularly to a control system for automatically raising or lowering the landing gear of the trailer as the tractor and trailer vehicles are coupled or uncoupled.

One of the objects of the present invention is to provide a novel control system for tractor-trailer vehicles of the type which are equipped with fluid pressure brakes, the system including an arrangement for automatically operating the landing gear of the trailer as the vehicles are mechanically coupled together and as the braking systems of the two vehicles are connected.

Another object is to provide in a control system of the above type, a novel construction for automatically locking the coupling between the two vehicles as the trailer landing gear is raised.

A further object is to provide a control system of the foregoing character which is highly efficient in its operation and which does not interfere in any manner whatsoever with the normal functions of the tractor-trailer braking systems.

Other objects and novel features of the invention will appear more fully hereinafter from a consideration of the following detailed description when taken in connection with the accompanying drawings. It is to be expressly understood however, that the drawings are employed for purposes of illustration only and are not to be taken as a definition of the limits of the invention, reference being had for this purpose to the claims appended hereto.

In the drawings, wherein similar reference characters refer to similar parts throughout the several views;

Fig. 1 is a partial side view of a tractor-trailer vehicle combination embodying the present invention;

Fig. 2 is a partial plan view of the tractor-trailer vehicles of Fig. 1;

Fig. 3 is an enlarged partial side view of a portion of the control mechanism;

Fig. 4 is a longitudinal sectional view taken along line 4—4 of Fig. 3, and

Fig. 5 is a modified form of locking device for the trailer king pin.

Referring more particularly to Figs. 1 and 2, the novel control system of the present invention is illustrated therein as being associated with a trailer vehicle 10 and a tractor vehicle 12, the former being provided with a pivoted landing gear or support 14, and both vehicles being adapted to be mechanically coupled together by a fifth wheel construction 16 including a trailer king pin 18 and a cooperating tractor locking lever 20. As shown in Fig. 1, the trailer is equipped with an air brake system 22 having service and emergency lines 24 and 26 respectively, the latter being provided with couplings 28 and 30 for connecting the trailer brake system to the tractor brake system, a portion of the emergency and service lines of which are shown at 29 and 31.

The trailer brake system 22 is of a conventional type and includes a relay valve 32, an emergency valve 34, a trailer reservoir 36 and a plurality of brake chambers, two of which are shown at 38. In the operation of a system of this type, the emergency line 26 is constantly charged with air pressure while the service line 24 is only charged when the tractor brake valve, not shown, is operated to cause application of the brakes on the two vehicles. When the tractor and trailer braking systems are coupled together, the reservoir 36 is charged by way of the emergency line 26, emergency valve 34, relay valve 32 and a conduit 40. In the event it is desired to effect a brake application, the charging of the service line 24, due to operation of the tractor brake valve, causes relay valve 32 to connect the reservoir 36 to the brake chambers 38 whereupon air pressure is conducted to the latter by way of conduit 40, relay valve 32, emergency valve 34 and a conduit 42. Upon release of the tractor brake valve, the service line 24 exhausts through the brake valve and the air pressure in the brake chambers 38 exhausts through the relay valve 32 in a well known manner. An emergency application of the trailer brakes occurs when the coupling 30 is uncoupled from the tractor emergency line and the trailer emergency line 26 is vented to atmosphere. When this occurs the emergency valve automatically connects the trailer reservoir 36 with the brake chambers 38 by way of conduit 40, relay valve 37, emergency valve 34 and conduit 47. Since the braking system just described, and including the valves 32 and 34, is well known in the art, it it not believed necessary to illustrate the construction in any greater detail.

One of the features of the present invention resides in coordinating the trailer braking system 22 with the trailer landing gear 14 in a novel manner such that the latter is automatically retracted or extended upon the coupling or uncoupling of the trailer braking system with the tractor braking system after the vehicles have been coupled together. More particularly, the novel arrangement includes a double-acting air motor 44 having a piston 46 and a piston rod 48, the latter being connected to a crosshead 50 carrying a pin 52 which is guided for longitudinal movement by slots 54 and 56 in spaced-apart rails 58 and 60. The landing gear 14 includes an axle 62, ground engaging wheels 64, 66, a pair of struts 68 pivoted at 70 to opposite sides of the trailer frame, and a rod 72 suitably connected with the struts 68, the said rod being also connected through a pair of levers 74 and 76 with the ends of the pin 52 in such manner that as the latter moves in opposite directions in the slots 54 and 56, the landing gear will be retracted or extended.

In order to secure the automatic operation of the landing gear 14, as indicated above, opposite ends of the air motor 44 are associated with the trailer braking system by means of a novel arrangement of valves. As shown, a reservoir 78 is arranged to be charged from the trailer emergency line 26 by way of conduit 80, an emergency valve 82, similar to the emergency valve 34, and a conduit 84. Emergency valve 82 is connected to one end of the motor 44 through a conduit 86 and is effective, under conditions which will appear more fully hereinafter, to cause extension of the landing gear 14. To retract the gear, the opposite end of the motor 44 is connected through a conduit 88 with a relay valve 90, similar to the relay valve 32, and the arrangement is such that when the relay valve 90 is operated, air pressure is conducted from the reservoir 78 to the air motor 44 by way of conduit 92, relay valve 90 and conduit 88. The emergency valve 82 is provided with an exhaust conduit 94 for exhausting the conduit 86 when the landing gear is being retracted, while the relay valve 90 is provided with an exhaust conduit 96 for exhausting the conduit 88 when the landing gear is extended.

A novel arrangement is provided for controlling the operation of the relay valve 90 in accordance with the mechanical coupling of the tractor and trailer, and in accordance with the coupling of the brake system of the two vehicles. As shown, such arrangement comprises a control valve 98 connected to the emergency line 26 through a conduit 100, and connected to the relay valve 90 through a conduit 102. The control valve 98 is provided with a movable valve element 104 which in one position, serves to connect the conduits 100 and 102, and which in another position serves to cut off the conduit 100 and connect the conduit 102 through the valve with an atmospheric exhaust conduit 106. Normally the element 104 is resiliently urged to an outer extended position, as shown in Fig. 1, to connect the conduit 102 with the atmospheric exhaust. When moved inwardly, the element 104 connects conduits 100 and 102. Valves of this type are well known in the art and it is therefore not believed necessary to illustrate and describe the construction in any greater detail.

In order to control the operation of the valve 98, the valve element 104 may be arranged to be moved inwardly as the tractor and trailer vehicles are coupled together at the fifth wheel. Any suitable construction may be provided to secure this operation. In the form of the invention illustrated in Figs. 1–4, the valve operating means includes the locking lever 20 which is pivotally mounted on the tractor and which is provided with a pair of jaws 110 and 112 adapted to interlock with the trailer king pin 18. As shown in Fig. 2, the control valve 90 is so arranged that when the locking lever 20 is moved to couple the vehicles together, the jaw 112 moves the valve element 104, to a position where conduits 100 and 102 are connected. On the other hand, when the lever 20 is moved to a non-coupling position, the jaws 110 and 112 are disengaged from the king pin 18 and the valve 98 assumes the position shown in Fig. 1 where conduit 100 is closed and conduit 102 is connected with the atmospheric exhaust 106.

A further feature of the invention includes a novel interlock between the vehicle coupling and the trailer landing gear which is so constituted as to positively lock the coupling in coupled position as the landing gear is raised or retracted. In the form of the invention shown the interlock includes a locking rod 114 which is movable to a locking position where one end of the rod is received within a recess 116 in the locking lever 20. A suitable guide 118 is provided for slidably supporting the rod 114 for reciprocating movement, such latter movement being caused by actuation of the crosshead 50. As shown, Figs. 1 and 4, rod 114 is connected with an oscillatable lever 120, the lower end of which is acted upon by a spring 122 which tends to move the rod 114 to locking position. An actuating link 124 is connected with the lever 120 and is suitably supported as to be engaged and moved by the crosshead 50 as the landing gear is extended. It will be clear that in such case, the link 124 moves the rod 114 to the unlocked position where the end of the rod is disengaged from the recess 116 in the locking lever 20. The vehicles may thus be readily uncoupled and the trailer allowed to remain parked with the landing gear 14 lowered. On the other hand, with the lever 20 in the position shown in Fig. 2, as soon as the landing gear 14 starts its retracting movement, the spring 122 moves the lever 120 in such a direction that the end of rod 114 is projected into the recess 116 to securely lock the vehicles in coupled relation.

Manual means may be provided for locking the landing gear 14 in either a raised or lowered position, in the event of loss of air pressure in the actuating system. As shown, Figs. 3 and 4, such means includes a locking pin 126 which may be selectively projected through one of a plurality of openings 128 in the rail 58 to be received within a recess 130 in the crosshead 50.

In operation, it will be understood that the tractor and trailer vehicles 12 and 10 respectively are mechanically coupled together through the fifth wheel device 16 prior to the coupling of the braking systems of the vehicles. As the locking lever 20 is moved into the locking position illustrated in Fig. 2, the jaw 112 engages and moves the valve element 104 of the control valve 98 in order to cut off communication between the conduit 102 and the atmospheric exhaust conduit 106 and to establish communication between conduit 102 and conduit 100. Thereafter, as soon as the trailer emergency line 26 is coupled to the tractor emergency line through the coupling 30, pressure will be promptly communicated to the actuating portion of relay valve 90 by way of conduit 100, control valve 98 and conduit 102. As soon as the relay valve 90 is energized, air pressure will be conducted to the left hand side of the piston 46 from reservoir 78 through conduit 92, relay valve 90 and conduit 88. Piston 46 and the parts connected thereto will thereupon be immediately moved to the right as viewed in Fig. 1, and retract the landing gear 14 through the connection between the said gear and the crosshead 50. At this time, the right hand end of the air motor 44 is connected to the atmospheric exhaust conduit 94 of valve 82 through conduit 86.

As the piston 46 moves to retract the landing gear 14, it will be readily understood that the spring 122 will be effective to move the locking rod 114 to the left as viewed in Fig. 1, in order to project the end of said rod within the recess 116 for the purpose of securely locking the lever 20 in the coupling position illustrated in Fig. 2.

It will be understood that since the emergency line 26 is continuously charged with air pressure from the tractor emergency line, the reservoirs 36 and 78 will be maintained in a charged condition through the connections heretofore set forth. It will also be understood that during operation of the coupled vehicles, the trailer brakes may be applied through the trailer service line 24 and that in the case of a disconnection between the vehicles, the reduction in pressure in the emergency line 26 will effect the emergency application of the trailer brake actuators 38 through operation of the emergency valve 34 which serves to connect the trailer reservoir 36 directly to the brake actuators 38.

When it is desired to uncouple the vehicles, the uncoupling of the trailer emergency line 26 from the tractor emergency line will immediately cause such a reduction of air pressure in the emergency valve 82 as to cause this valve to operate and connect the reservoir 78 to the air motor 44 at the right of the piston 46, as viewed in Fig. 1. As valve 82 operates in this manner, the air pressure flows from the reservoir 78 through conduit 84, valve 82 and conduit 86 to the motor 44. At this time, the relay valve 90 is operative to disconnect the reservoir 78 from the conduit 88 and to connect the latter to the atmospheric exhaust 96, this by reason of the reduction of pressure in the relay valve due to connected conduits 102 and 100 and the reduction of pressure in the trailer emergency line 26. As soon as the piston 46 moves to the left, as viewed in Fig. 1, the landing gear 14 will be extended and the locking bar 114 will release the lever 20. The latter may then be moved to a release position and the tractor may be moved away from the trailer. Upon movement of lever 20 to its released position, the valve operating element will move to disconnect conduits 100 and 102 and connect the latter with the exhaust conduit 106.

Fig. 5 shows a slightly modified form of the coupling device between the tractor and trailer vehicles wherein the locking lever includes a pair of pivoted levers 132 and 134 which are provided with suitable openings 136 and 138 for receiving the locking bar 114, when the levers are coupled with the trailer king pin 18.

From the foregoing description it will be readily understood that the present invention provides a novel construction which is especially adaptable for tractor-trailer vehicle trains wherein the vehicles are equipped with air pressure brakes. The arrangement affords an efficient method of controlling the movement of the trailer landing gear as the vehicles are coupled and uncoupled and includes an automatically operable device for locking the coupling in coupled position as the landing gear is retracted. While the control valve 98 has been described herein as being operable upon movement of the lever 20 to coupled position, it will be understood that any suitable arrangement may be provided for operating this valve in response to the mechanical coupling of the vehicles.

While the invention has been shown and described herein with considerable particularity, it will be readily understood by those skilled in the art that various modifications may be resorted to without departing from the spirit of the invention. Reference will therefore be had to the appended claims for a definition of the limits of the invention.

What is claimed is:

1. In a tractor-trailer vehicle train having a coupling device for mechanically coupling the tractor and trailer and wherein the tractor and trailer are each provided with an air brake system including service and emergency lines, a landing gear on the trailer mounted for movement to a retracted or to an extended position, a double-acting fluid pressure operated motor for so moving the landing gear, means controlled jointly by operation of the coupling device when the vehicles are coupled and by an increase in the air pressure in the trailer emergency line for energizing said motor in one direction, and separate means controlled by a reduction in the air pressure in the trailer emergency line for energizing the motor in the opposite direction.

2. In a tractor-trailer vehicle train having a coupling device for mechanically coupling the tractor and trailer and wherein the tractor and trailer are each provided with an air brake system including service and emergency lines, a landing gear on the trailer mounted for movement to a retracted or to an extended position, a double-acting fluid pressure operated motor for so moving the landing gear, means controlled by an increase in the air pressure in the trailer emergency line when the vehicles are coupled for charging said motor to retract the landing gear, means operable in response to retraction of the landing gear for positively locking the coupling device in coupled position, means controlled by a reduction in the air pressure in the trailer emergency line for charging said motor to extend the landing gear, and means operable in response to extension of the landing gear for unlocking the coupling device.

3. In a tractor-trailer vehicle train having a coupling device for mechanically coupling the tractor and trailer and wherein the tractor and trailer are each provided with an air brake system including service and emergency lines, a landing gear on the trailer mounted for movement to a retracted or to an extended position, a double-acting fluid pressure operated motor for so moving the landing gear, means controlled by an increase in the air pressure in the trailer emergency line when the vehicles are coupled for charging said motor to retract the landing gear, a movable member for positively locking the coupling device in coupled position, means including a spring for moving said member to a locking position in response to retraction of the landing gear, means controlled by a reduction in the air pressure in the trailer emergency line for charging said motor to extend the landing gear, and means operable in response to extension of the landing gear for moving said member to unlocking position.

4. In a tractor-trailer vehicle train having a coupling device for mechanically coupling the tractor and trailer and wherein the tractor and trailer are each provided with an air brake system including service and emergency lines, a landing gear on the trailer mounted for movement to a retracted or to an extended position, a double-acting fluid pressure operated motor for so moving the landing gear, a source of air pressure on the trailer for actuating said motor, means for charging said source from the trailer emergency line when the tractor and trailer brake systems are coupled together, valve means responsive to an increase in pressure in the trailer emergency line to connect said source and motor to actuate the latter to retract the landing gear, and means responsive to the coupling of the vehicles to connect the trailer emergency line to said valve means.

5. Apparatus as set forth in claim 4 wherein the coupling device includes a locking lever and the responsive means includes a valve operable on movement of the lever to a coupling position.

6. Apparatus as set forth in claim 5 which includes in addition, a member movable to lock the lever in coupled position in response to retraction of the landing gear.

7. In a tractor-trailer vehicle train having a coupling device for mechanically coupling the tractor and trailer and wherein the tractor and trailer are each provided with a fluid pressure brake system, a pivotally mounted landing gear on the trailer mounted for movement to a retracted or to an extended position, power means operable by fluid pressure from the trailer brake system for operating said landing gear to said retracted and extended positions, and means including a valve controlled by said coupling device for connecting said trailer brake system and power means when the vehicles are mechanically coupled.

8. In a tractor-trailer vehicle train having a coupling device for mechanically coupling the tractor and trailer and wherein the tractor and trailer are each provided with a fluid pressure brake system, a pivotally mounted landing gear on the trailer mounted for movement to a retracted or to an extended position, power means operable by fluid pressure from the trailer brake system for operating said landing gear to said retracted and extended positions, means including a valve controlled by said coupling device for connecting said trailer brake system and power means when the vehicles are mechanically coupled to energize the power means to retract the landing gear, and means operable in response to retraction of the landing gear for positively locking the coupling device in coupled position.

9. In a tractor-trailer vehicle train having a coupling device for mechanically coupling the tractor and trailer and wherein the tractor and trailer are each provided with a fluid pressure brake system, a landing gear on the trailer mounted for movement to a retracted or to an extended position, fluid pressure operated means for operating said landing gear to said retracted and extended positions, means including a first valve device for connecting the trailer brake system with the fluid pressure operated means to move the landing gear to said extended position, means including a second valve device for connecting the trailer brake system with the fluid pressure operated means to move the landing gear to said retracted position, and means controlled by said coupling device when the vehicles are mechanically coupled for operating said second valve device.

10. In a tractor-trailer vehicle train having a coupling device for mechanically coupling the tractor and trailer and wherein the tractor and trailer are each provided with a fluid pressure brake system, a landing gear on the trailer mounted for movement to a retracted or to an extended position, fluid pressure operated means for operating said landing gear to said retracted and extended positions, means including a first valve device for connecting the trailer brake system with the fluid pressure operated means to move the landing gear to said extended position, means including a second valve device for connecting the trailer brake system with the fluid pressure operated means to move the landing gear to said retracted position, means controlled by said coupling device when the vehicles are mechanically coupled for operating said second valve device, and means operable in response to movement of the landing gear to said retracted position for positively locking the coupling device in coupled position.

11. In a tractor-trailer vehicle train having a coupling device for mechanically coupling the tractor and trailer vehicles and wherein the tractor and trailer are each provided with a fluid pressure brake system, a pivotally mounted landing gear on the trailer mounted for movement to a retracted or to an extended position, power means operable by fluid pressure from the trailer brake system for operating said landing gear to said retracted position, and means including a valve controlled by said coupling device for connecting said trailer brake system and power means when the vehicles are mechanically coupled.

ELLERY R. FITCH.

References Cited in the file of this patent

UNITED STATES PATENTS

| Number | Name | Date |
| --- | --- | --- |
| 1,739,496 | Bartholomew | Dec. 17, 1929 |
| 1,838,868 | Reid | Dec. 29, 1931 |
| 2,193,049 | Walther et al. | Mar. 12, 1940 |
| 2,417,903 | Bennett | Mar. 25, 1947 |